(12) United States Patent
Yamamoto

(10) Patent No.: US 8,621,325 B2
(45) Date of Patent: Dec. 31, 2013

(54) PACKET SWITCHING SYSTEM

(75) Inventor: Kanta Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 387 days.

(21) Appl. No.: 12/619,803

(22) Filed: Nov. 17, 2009

(65) Prior Publication Data

US 2010/0091775 A1    Apr. 15, 2010

Related U.S. Application Data

(63) Continuation of application No. PCT/JP2007/061310, filed on Jun. 4, 2007.

(51) Int. Cl.
*H04L 12/28* (2006.01)
*G11C 29/00* (2006.01)
*G06F 13/00* (2006.01)

(52) U.S. Cl.
USPC ............. 714/766; 714/54; 714/768; 711/155; 370/395.5

(58) Field of Classification Search
None
See application file for complete search history.

(56) References Cited

U.S. PATENT DOCUMENTS

| | | | | |
|---|---|---|---|---|
| 3,959,596 A * | 5/1976 | Bojanek et al. | ............... | 370/374 |
| 5,088,089 A * | 2/1992 | Gingell et al. | ................ | 370/363 |
| 5,379,413 A * | 1/1995 | Hazen et al. | ................... | 714/719 |
| 5,703,871 A * | 12/1997 | Pope et al. | ..................... | 370/248 |
| 5,875,217 A * | 2/1999 | Hartmann et al. | ............ | 375/372 |
| 5,915,094 A * | 6/1999 | Kouloheris et al. | ........... | 709/219 |
| 5,956,324 A * | 9/1999 | Engdahl et al. | ................ | 370/242 |
| 6,334,174 B1 * | 12/2001 | Delp et al. | ..................... | 711/167 |
| 6,615,333 B1 * | 9/2003 | Hoogerbrugge et al. | ..... | 711/169 |
| 7,257,672 B2 * | 8/2007 | Shoham et al. | ............... | 711/108 |
| 7,290,083 B2 * | 10/2007 | Shoham et al. | ............... | 711/108 |
| 7,558,839 B1 * | 7/2009 | McGovern | ..................... | 709/218 |
| 7,636,317 B2 * | 12/2009 | Stott et al. | ..................... | 370/241 |
| 7,724,643 B2 * | 5/2010 | Kakihara | ....................... | 370/216 |
| 7,869,343 B1 * | 1/2011 | Xue et al. | ....................... | 370/216 |
| 2002/0031141 A1 * | 3/2002 | McWilliams | ................... | 370/463 |
| 2003/0196100 A1 * | 10/2003 | Grawrock et al. | ............ | 713/193 |
| 2004/0190537 A1 * | 9/2004 | Ferguson et al. | ............. | 370/412 |
| 2005/0025139 A1 * | 2/2005 | Brueckner et al. | ............ | 370/362 |
| 2005/0044471 A1 | 2/2005 | Chia et al. | | |
| 2005/0172086 A1 * | 8/2005 | Kawai | ............................ | 711/154 |
| 2005/0251628 A1 * | 11/2005 | Jarvis et al. | .................... | 711/136 |
| 2006/0015683 A1 * | 1/2006 | Ashmore et al. | .............. | 711/113 |

(Continued)

FOREIGN PATENT DOCUMENTS

| | | |
|---|---|---|
| JP | 2003-218932 | 7/2003 |
| JP | 2003283539 | 10/2003 |

OTHER PUBLICATIONS

Luca Martini et al. "Encapsulation Methods for Transport of Ethernet over MPLS Networks" draft-ietf-pwe3-ethernet-encap10.txt, Network Working Group, Jun. 2005.*

(Continued)

*Primary Examiner* — Faruk Hamza
*Assistant Examiner* — Andrew Oh
(74) *Attorney, Agent, or Firm* — Katten Muchin Rosenman LLP

(57) ABSTRACT

A packet switching system includes a forwarding processing unit determining a destination of an input packet by analyzing the input packet and outputting it as an output packet, the forwarding processing unit comprises an ingress interface card checking if the input packet has a sequential cyclic number and an egress interface card creating a sequential cyclic number and assigning it to the output packet.

18 Claims, 11 Drawing Sheets

(56) References Cited

U.S. PATENT DOCUMENTS

| | | | |
|---|---|---|---|
| 2006/0056321 A1* | 3/2006 | Kakihara | 370/276 |
| 2006/0080498 A1* | 4/2006 | Shoham et al. | 711/108 |
| 2006/0109792 A1* | 5/2006 | Broadbent et al. | 370/248 |
| 2006/0271690 A1* | 11/2006 | Banga et al. | 709/228 |
| 2006/0285500 A1* | 12/2006 | Booth et al. | 370/250 |
| 2007/0008975 A1* | 1/2007 | Kalkunte | 370/392 |
| 2007/0242637 A1* | 10/2007 | Dynarski et al. | 370/331 |
| 2008/0031129 A1* | 2/2008 | Arseneault et al. | 370/218 |
| 2008/0117810 A1* | 5/2008 | Stott et al. | 370/230 |
| 2008/0198858 A1* | 8/2008 | Townsley et al. | 370/401 |
| 2010/0091775 A1* | 4/2010 | Yamamoto | 370/392 |

OTHER PUBLICATIONS

Notice of Reasons for Rejection dated Feb. 8, 2011, from the corresponding Japanese Application.

Great Britain Office Action dated Apr. 27, 2011, from corresponding Great Britain Application No. GB0921061.8.

Luca Martini et al. "Encapsulation Methods for Transport of Ethernet over MPLS Networks" draft-ietf-pwe3-ethernet-encap-10.txt, Network Working Group, Jun. 2005.

* cited by examiner

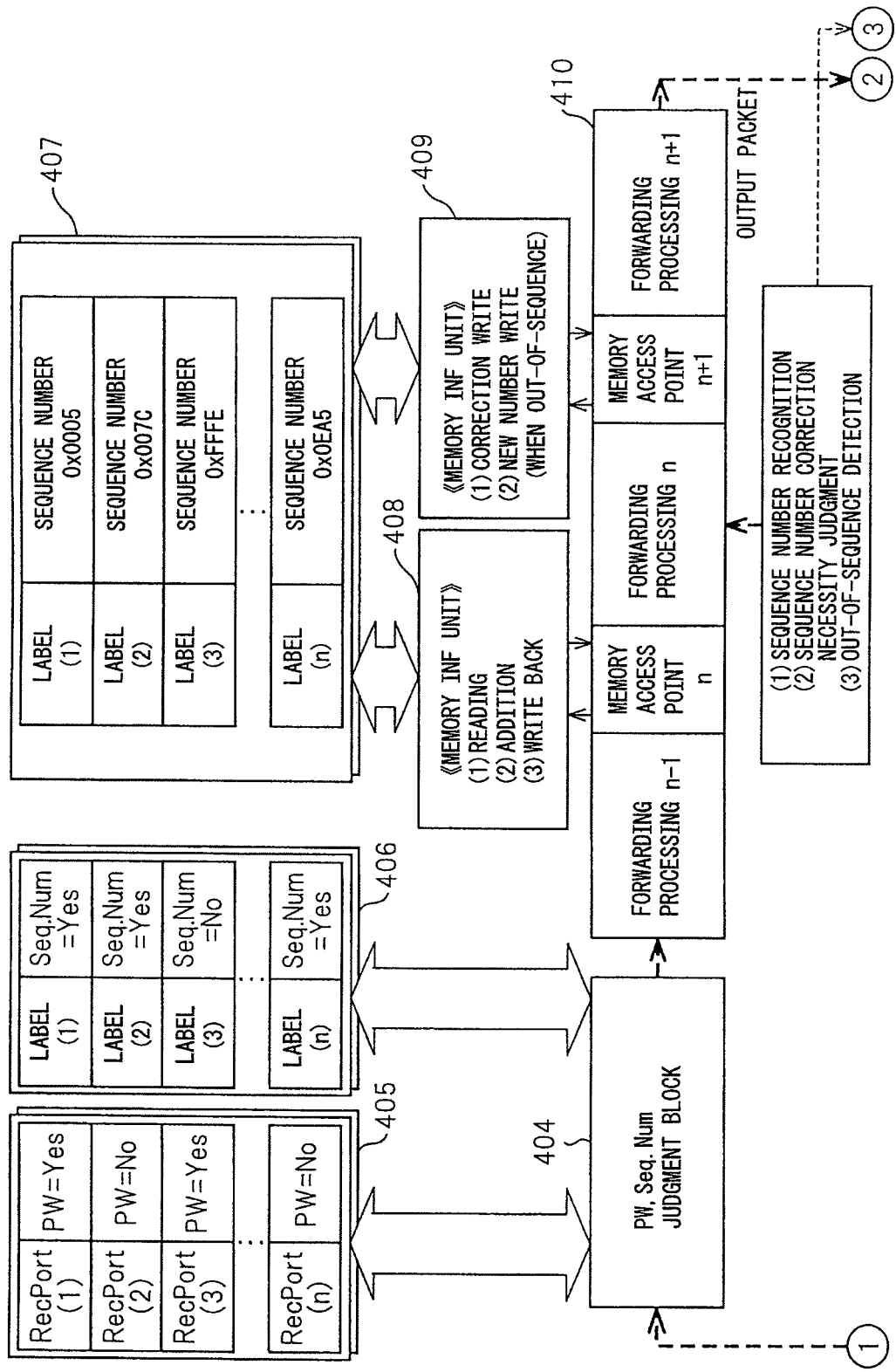

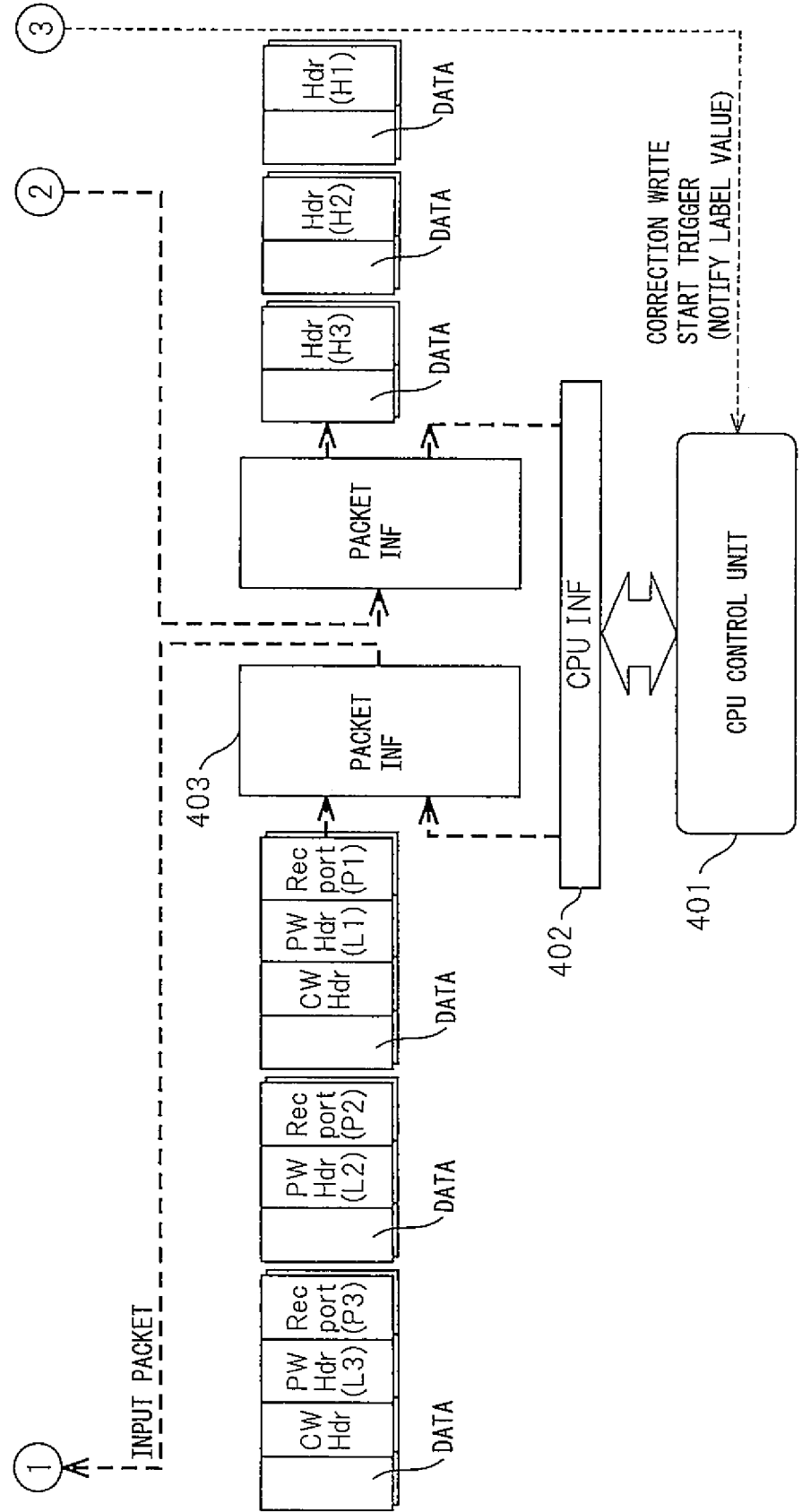

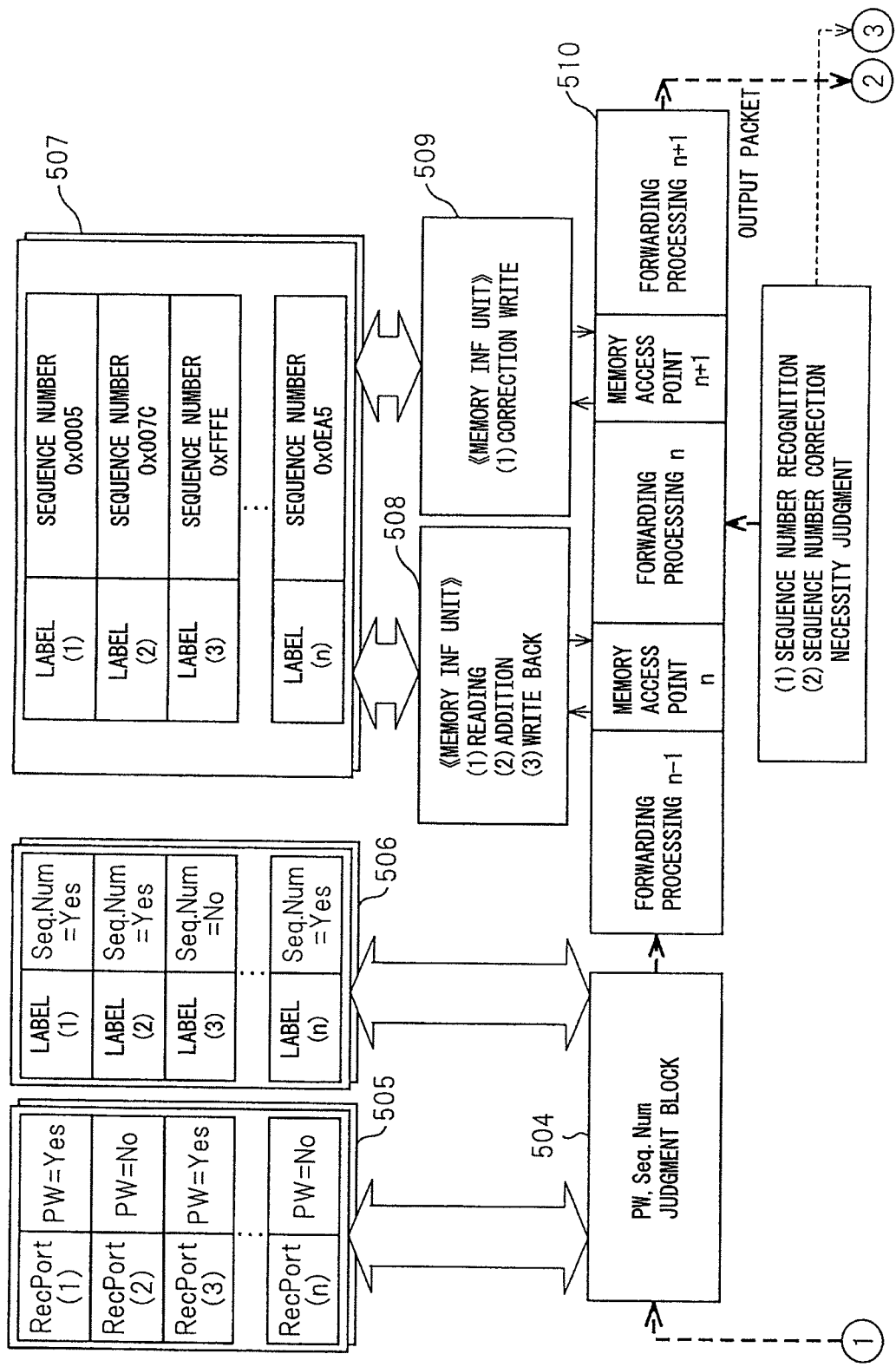

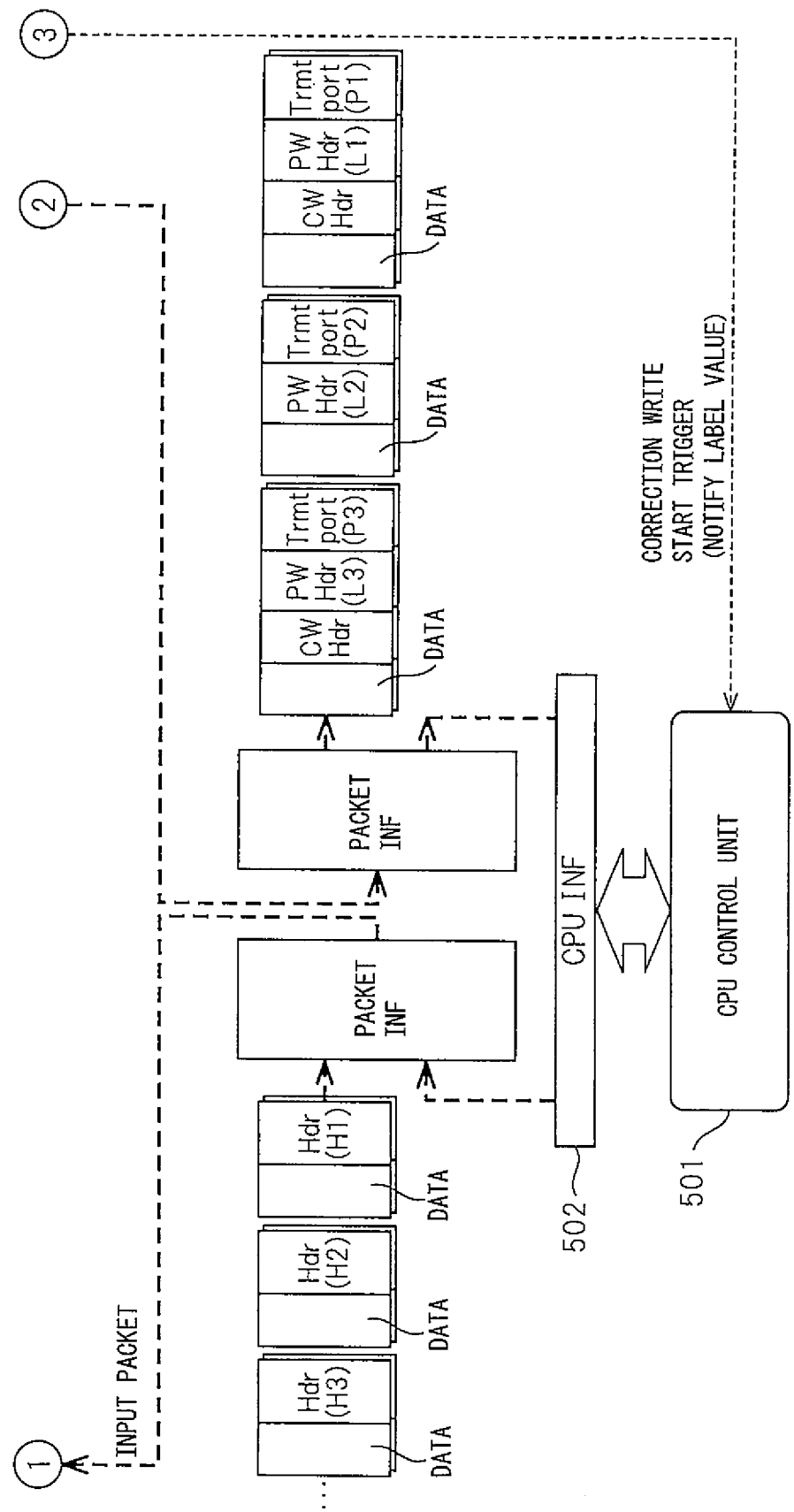

Fig.6A  PW FRAME WITH NO CONTROL WORD

| PW LABEL (20) | EXP (3) | S | TTL (8) |
|---|---|---|---|
| CLIENT DATA (ETHERNET)® | | | |

Fig.6B  PW FRAME WITH CONTROL WORD

| PW LABEL (20) | EXP (3) | S | TTL (8) |
|---|---|---|---|
| all "0" RESERVED (12) | SEQUENTIAL NUMBER (16) | | |
| CLIENT DATA (ETHERNET)® | | | |

Fig.6C  PW FRAME WITH CONTROL WORD (PW-RELATED CHANNEL [RFC4385])

| PW LABEL (20) | EXP (3) | S | TTL (8) |
|---|---|---|---|
| 0 0 0 1 RESERVED (12) | SEQUENTIAL NUMBER (16) | | |
| CLIENT DATA (ETHERNET)® | | | |

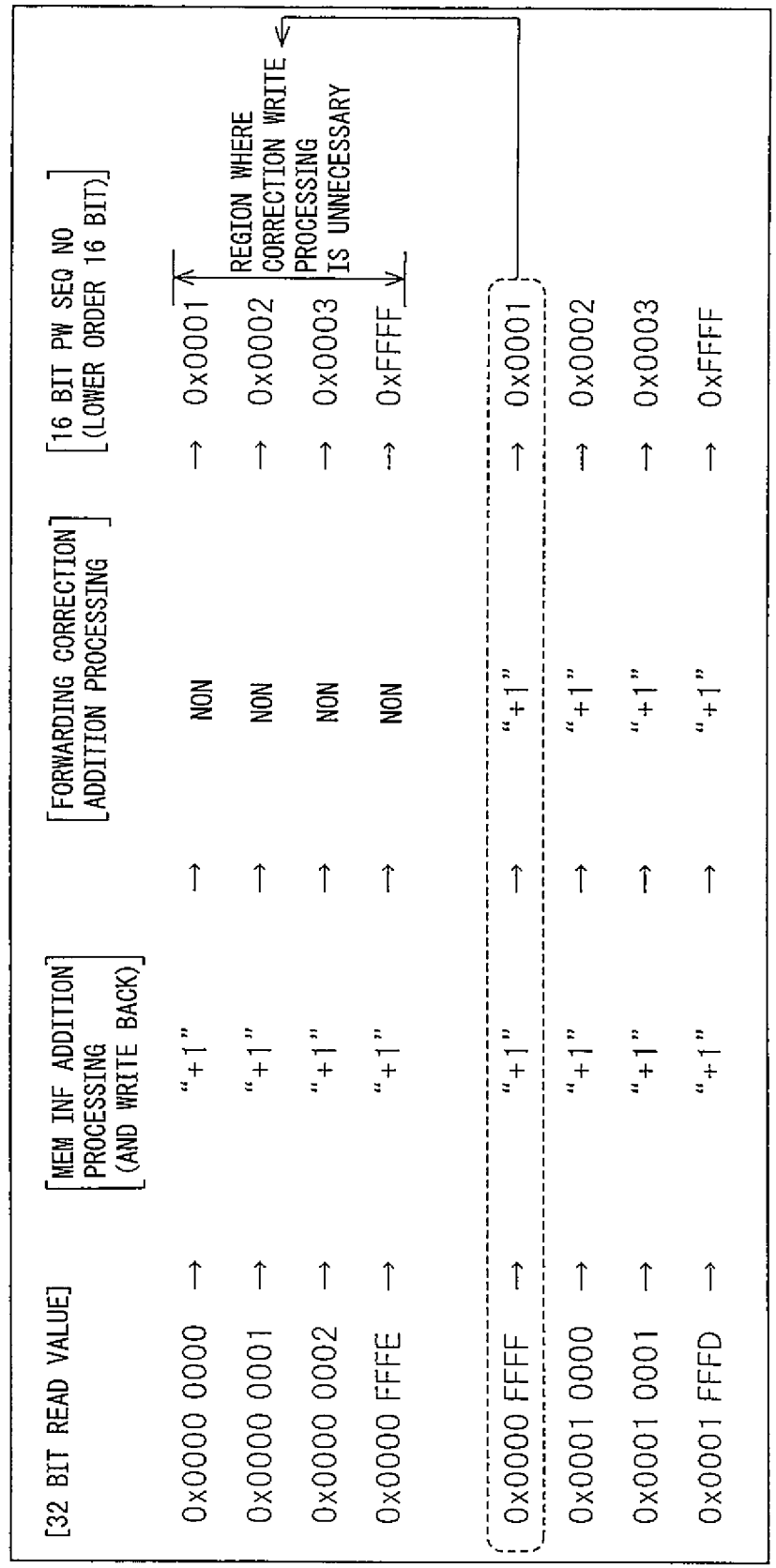

Fig.8

| [32-BIT COUNTER READ VALUE] | | [HIGHER 16 BIT CORRECTION] | [LOWER 16 BIT CORRECTION] | | [WRITE BACK VALUE (32 BIT)] |
|---|---|---|---|---|---|
| 0x0000 FFFF | ↑ | "0x0000" FIXED | | ↑ | 0x0000 0000 |
| 0x0001 0000 | ↑ | "0x0000" FIXED | "+1" | ↑ | 0x0000 0001 |
| 0x0001 0001 | ↑ | "0x0000" FIXED | "+1" | ↑ | 0x0000 0002 |
| 0x0001 0002 | ↑ | "0x0000" FIXED | "+1" | ↑ | 0x0000 0003 |
| 0x0001 0003 | ↑ | "0x0000" FIXED | "+1" | ↑ | 0x0000 0004 |

Fig.9

| [CURRENT SEQUENCE NUMBER VALUE] | [HIGHER 16 BIT CORRECTION] | [LOWER 16 BIT CORRECTION] | [WRITE BACK VALUE (32 BIT)] |
|---|---|---|---|
| 0x0001 | → "0x0000" FIXED | NON | ↑ 0x0000 0001 |
| 0x0002 | → "0x0000" FIXED | NON | ↑ 0x0000 0002 |
| 0x0003 | → "0x0000" FIXED | NON | ↑ 0x0000 0003 |
| 0x0004 | → "0x0000" FIXED | NON | ↑ 0x0000 0004 |
| 0x0005 | → "0x0000" FIXED | NON | ↑ 0x0000 0005 |

PACKET SWITCHING SYSTEM

CROSS-REFERENCE TO RELATED APPLICATION

This application is a continuation application based on International Application No. PCT/JP2007/061310, filed on Jun. 4, 2007, the contents being incorporated herein by reference.

FIELD

The present invention relates to a packet switching system, more particularly relates to a packet switching system applied for check control and creation control of sequential cyclic numbers in a forwarding processing unit in a packing switching system. In more detail, the present invention is applied for check control and creation control of sequential cyclic numbers in a forwarding processing unit of a general packet switching system. Specifically, application to pseudo wire (specified in RFC4385) 16-bit sequence numbers may be mentioned.

BACKGROUND ART

In recent years, in forwarding processing units of packet switching systems, in response to the demand for network integration, simultaneous realization of L2 (layer 2 switch), VLAN (virtual LAN), MPLS (multi-protocol label switching), PW (pseudo wire), IP (Internet protocol), and other various forwarding processing has been sought.

As techniques to realize these, a FPGA (field programmable gate array), LSI (large scale integrated circuit), and other hardware-based forwarding techniques having superiority in high speed, software processing-based forwarding techniques having superiority in flexibility, and other programmable chip-based forwarding techniques etc. as their intermediate NPU (network processor unit) may be mentioned. In these various techniques, the basic performance requirements demanded are high throughput, flexibility, and programmability.

The embodiments took note of the performance of the look-up processing in the memory contained in the forwarding unit so as to achieve high throughput, flexibility, programmability of a forwarding processing unit in a packet switching system regardless of the technique mentioned above.

Regardless of the technique for realizing the forwarding processing unit in a packet switching system, the forwarding processing unit must perform table look-up processing. A table in the forwarding processing unit is arranged outside or inside a chip forming the forwarding processing unit. Packet header information and a receiving port number, etc. are used as the address for each input packet to look up a series of tables and perform usual packet processing. In this case, to achieve 100% throughput of input packets (wire speed processing), each table look-up operation must be completed within a limited time interval.

If, in one table look-up operation, packets are input at a rate greater than the maximum possible access rate with which the table memory can be accessed, 100% throughput cannot be achieved. For this reason, the number of clock cycles necessary for one table look-up operation for packets needs to be kept within a certain range.

As related art, there is the invention described in Patent Document 1. This document discloses the art of automatically loading addresses of traffic particularly heavy in load or exceeding a threshold value predicted and set in advance in a detailed table in the forwarding tables, but does not disclose keeping the number of clock cycles necessary for one table look-up operation for packets within a certain range.

Patent Document 1: Japanese Laid-Open Patent Publication No. 2005-117214

FIG. 3 is a block diagram showing the relationship between a conventional sequence number memory and a forwarding processing unit for explaining the problem to be solved by the embodiments. In FIG. 3, 31 indicates a sequence number memory, 32 a memory interface unit, and 33 a forwarding processing unit. In a PW or other packet switching system, the sequence of packets for voice data, music data, etc. is crucial. The data becomes meaningless if the sequence of packets is jumbled. To maintain the packet sequence, a sequence number is assigned to each pseudo wire (PW) having a control (see FIG. 6). In FIG. 3, the current sequence numbers 0x0005, 0x007C, . . . , 0x0EA5 corresponding to the PW addresses (1), (2), . . . (n) are stored in the sequence number memory 31. Note that, the "0x"s at the heads of the sequence numbers signify, as is common knowledge, that the following numerical values are hexadecimal.

The forwarding processing unit 33 accesses the sequence number memory 31 at the $n^{th}$ (wherein n is a positive integer) access point which follows the n–$1^{th}$ forwarding processing. The memory interface unit 32, responding to the access, carries out (1) reading, (2) addition, (3) comparison, (4) round up, and (5) write back processing operations. Of these, (3) and (4) are executed only when, as will be detailed later, the sequence number is a specific value.

The forwarding processing unit 33 runs forwarding processing based on the processing results by the memory interface unit 32 and outputs the results as output packets.

The first step, in a table look-up operation for an usual forwarding processing unit 33, referring to the sequence number memory 31 is the (1) read processing with respect to the sequence number memory 31. In this processing, reading a sequence number stored in the sequence number memory 31 is read by using as an address the header information of an input packet. This processing is carried out for each input packet, therefore the higher the rate of input packets, the higher the access rate to the sequence number memory 31 demanded. Generally, the higher speed of the band of the sequence number memory 31 can be attained by increasing the number of operating clocks of the sequence number memory 31, increasing the number of data bits, etc.

Here, the problem to be addressed is that when processing does not conclude by just reading from the sequence number memory 31, but certain judgment is required and the result of judgment has to be written back, based on the read sequence number, into the same memory space as the read out memory space, wherein the processing will sometimes not be completed within "the number of consumed clock cycles which one read processing operation must observe to achieve 100% throughput of wire speed processing".

Specifically, in processing of adding a 16-bit sequence number, defined by a control word supported by pseudo wire (PW) packets, to a PW frame, as shown in the memory interface unit 32, the series of processing operations of (1) reading the sequence number stored in the sequence number memory 31 for read processing, (2) adding 1 to the read sequence number for addition processing, and (5) writing back the result of addition to the same memory space as the memory space from which the result of addition was read. However, according to processing conforming to the RFC standard, the number after the sequence number=0xFFFF is not 0xFFFF+1=0x0000 but 0xFFFF+2=0x0001 (referred to as "roundup processing" here), where 0x0000 must be skipped. This is because in the RFC standard for a pseudo wire, the sequence number=0x0000 is defined as meaning "sequence number not used". In this case, the series of processing operations, i.e. (1) reading, (3) comparison, (2) or (4) addition or round up, and (5) write back processing operations is necessary. Keeping these processing operations within a certain number of clock cycles, that is allowable for one access to a table, is, however, extremely difficult.

Accordingly, it is an object of the embodiments to enable completion of the necessary processing within a certain number of clock cycles allowed for one access to a table in a forwarding processing unit of a packet switching system.

SUMMARY

To achieve the above object, a first aspect of the invention provides a packet switching system comprising a forwarding processing unit determining a destination of an input packet by analyzing the input packet and outputting it as an output packet, the forwarding processing unit comprises an ingress interface card checking if the input packet has a sequential cyclic number and an egress interface card creating a sequential cyclic number and assigning it to the output packet.

According to a second aspect of the invention, in the first aspect, the ingress interface card is provided with a check control memory for cyclic numbers and a first memory interface unit and second memory interface unit for dividing one access processing for the check control memory into two by performing the processing at consecutive first and second memory access points, wherein, after processing by the first memory interface unit at the first access point, the forwarding processing unit judges whether correction of the results of processing by the first memory interface unit is necessary, while the second memory interface unit corrects the sequence number read from an address space of the check control memory at the second access point and writes it to the address space of the check control memory when the forwarding processing unit judges that correction is necessary.

BRIEF DESCRIPTION OF DRAWINGS

FIG. 4A is a block diagram illustrating a portion of a configuration of an ingress interface card in a packet forwarding unit according to a first embodiment of the invention.

FIG. 4B is a block diagram illustrating another portion of a configuration of an ingress interface card in a packet forwarding unit according to a first embodiment of the invention.

FIG. 5A is a block diagram illustrating a portion of a configuration of an egress interface card in a packet forwarding unit according to a first embodiment of the invention.

FIG. 5B is a block diagram illustrating a portion of a configuration of an egress interface card in a packet forwarding unit according to a first embodiment of the present invention.

FIGS. 6A-6C are views illustrating a configuration of a pseudo wire frame used in an embodiment of the invention.

FIG. 7 is a view explaining a sequence number recognition method by a forwarding processing unit in a first embodiment of the invention.

FIG. 8 is a view explaining correction write processing in a first embodiment of the invention.

FIG. 9 is a view explaining new write processing in a first embodiment of the invention.

DESCRIPTION OF EMBODIMENTS

Figure 1:
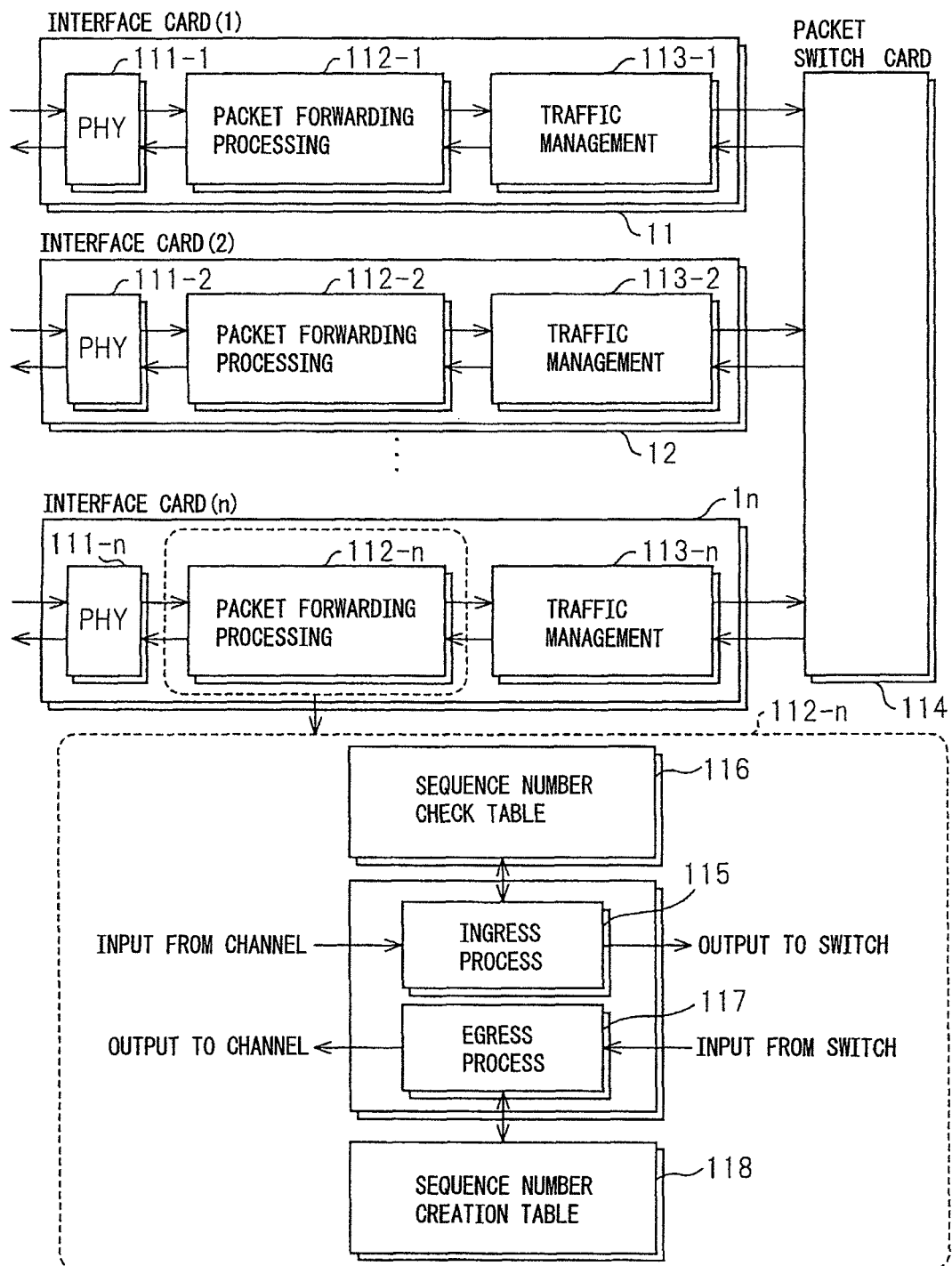
FIG. 1 is a block diagram illustrating a schematic configuration of a packet switching system according to a first embodiment of the invention.

FIG. 1 is a block diagram illustrating a schematic configuration of a packet switching system according to an embodiment of the invention.

In FIG. 1, the packet switching system is broadly divided into interface cards 11, 12, . . . 1$n$ and a packet switching card 114. The interface cards 11, 12, . . . 1$n$ are provided with physical layers (PHY) 111-1, 111-2, . . . 111-$n$, packet forwarding processing units 112-1, 112-2, . . . 112$n$, and traffic control units 113-1, 113-2, 113-$n$ respectively.

The embodiment of the invention relates to an improvement of the packet forwarding processing units 112-1, 112-2, . . . 112$n$ in the interface cards 11, 12, . . . 1$n$. A schematic configuration of the packet forwarding processing unit 112-$n$ is shown in the lower half of FIG. 1. As illustrated, the packet forwarding processing unit 112-$n$ is provided with an ingress 115 receiving and processing an input packet from a channel, a sequence number check table 116 connected to the ingress 115, an egress 117 receiving and processing a packet input from a packet switching card 114, and a sequence number creation table 118 connected to the egress 117.

Of the input packets from a channel or the packets output from the packet switching card 114, there are packets for voice data, music data, and the like where the packet sequence is an important element. It is necessary to check if the input packets are input in the correct sequence and to generate packets for outputting the output packets in the correct sequence.

In the processing at the ingress 115, based on the header information of an input packet from a channel, forwarding judgment, e.g. judgment of the destination and judgment of the priority is performed. In one embodiment of the invention, the processing at the ingress 115 includes a check function for sequence numbers that looks up a sequence number check table 116, while the processing at the egress 117 includes a creation function for sequence numbers that looks up a sequence number creation table 118, whereby the load of sequence number control processing is dispersed (claim 1).

Depending on the attributes of the I/O ports, it may also be necessary to deal with differing lower layer protocols. In OC-n interfaces, a generic framing procedure (GFP), point-to-point protocol (PPP), and other encapsulation as well as MPLS encapsulation and PW encapsulation processing or the opposing MPLS decapsulation and PW decapsulation etc., are carried out at the forwarding processing unit 112-$n$. The other forwarding processing units 112-1, 112-2, . . . also perform similar operations.

Figure 2:
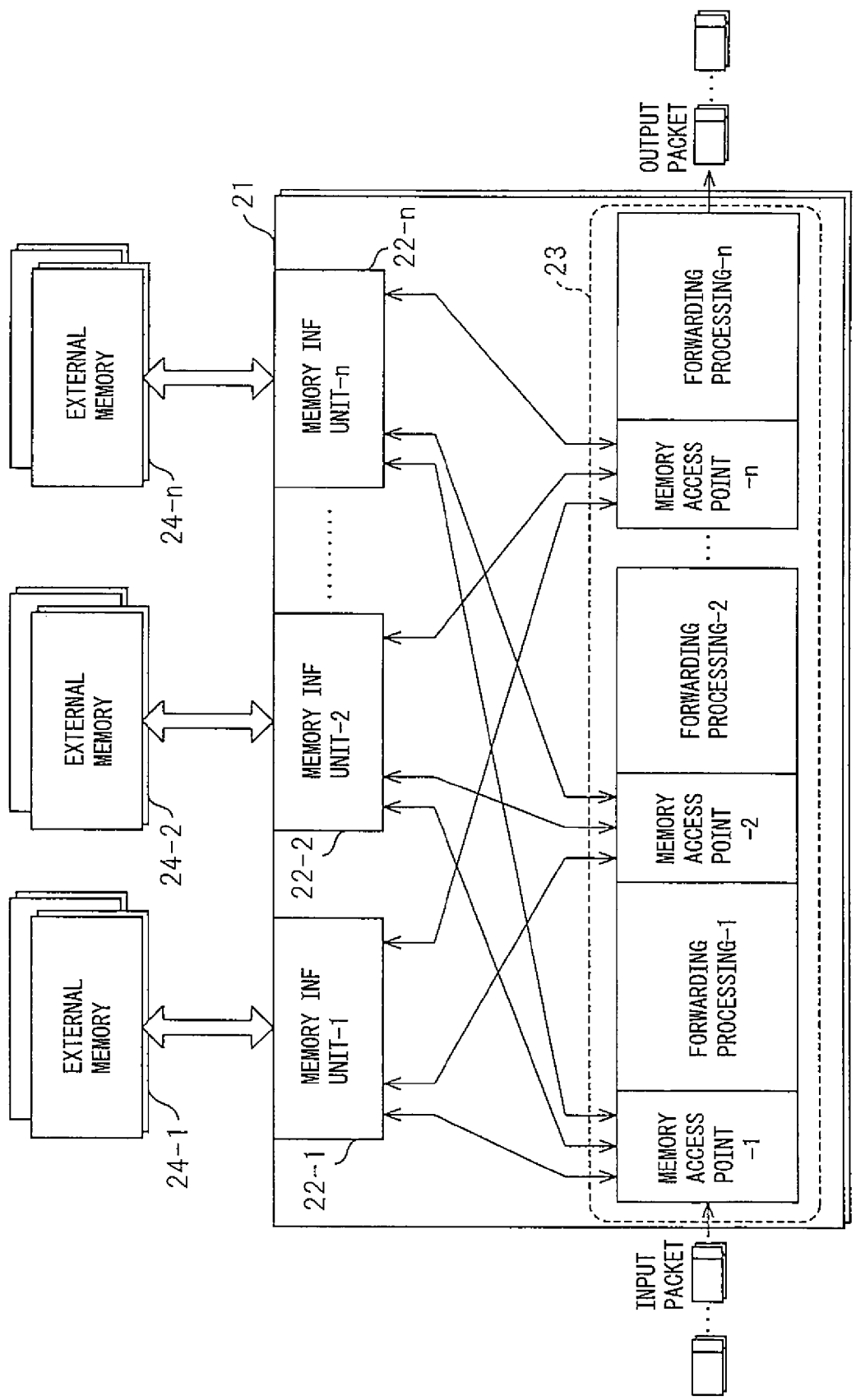
FIG. 2 is a block diagram illustrating a configuration of a packet forwarding unit in the packet switching system shown in FIG. 1.

FIG. 2 is a block diagram illustrating a configuration of the packet forwarding unit in the packet switching system shown in FIG. 1. In FIG. 2, the packet forwarding processing unit 21 represents one of the forwarding processing units 112-1, 112-2, . . . 112-$n$ shown in FIG. 1. Such a packet forwarding processing unit 21 is provided with memory interface (INF) units 22-1, 22-2, . . . 22-$n$ and a pipeline unit 23 connected to these interface units. The memory interface units 22-1, 22-2, . . . 22-$n$ are connected to external memories 24-1, 24-2, 24-$n$, respectively. The pipeline unit 23 comprises a memory access point-1, forwarding processing unit-1, memory access point-2, forwarding processing unit-2, . . . memory access point-n, and forwarding processing unit-n which are coupled together in a pipeline configuration. The external memories 24-1, 24-2, . . . 24-n store the different types of forwarding table information. The memory interface units 22-1, 22-2, . . . 22-n control and adjust the access to the external memories 24-1, 24-2, . . . 24-n. Access to the memories is carried out at the memory access points in the pipeline unit 23 to which packets are input. The forwarding processing units in the pipeline unit 23, based on the results of reading from these tables, run the different types of processing (destination information acquisition, priority information acquisition, pass-through/discard information acquisition, etc.) The external memories 24-1, 24-2, . . . 24-n do not necessarily have to be external and may be installed in the packet forwarding processing units 21.

The memory interface units 22-1, 22-2, . . . 22-n receive access requests from the different memory access points in the pipeline unit 23 and run adjustment processing and simple arithmetic processing for memory access. In the pipeline unit 23, a memory access point and a forwarding processing unit make up one set, and a plurality of sets are arranged sequentially (claim 8). This architecture enables processing at that next memory access point in situations when for example processing cannot be completed until the next memory access point due to a heavy forwarding processing load.

First, an embodiment of check control of a 16-bit sequence number of a pseudo wire (PW) is shown.

FIG. 4A and FIG. 4B are block diagrams illustrating configurations of an ingress interface card of the packet forwarding processing unit according to one embodiment of the present invention. In FIGS. 4A and 4B, the ingress interface card is provided with a CPU control unit 401, CPU interface unit 402, packet interface unit 403, PW sequence number judgment block 404, receiving port (RecPort) attribute table 405, sequence number (Seq. Num) presence table 406, sequence number check control memory 407, first memory interface unit 408, second memory interface unit 409, and forwarding processing unit 410.

The receiving port attribute table 405 is used to judge whether a receiving port number is one that corresponds to pseudo wire (PW) frames. In the illustrated example, the receiving port (1) is for pseudo wires, the receiving port (2) is for non-pseudo wires, and the receiving port (3) is for pseudo wires.

The sequence number presence table 406 stores the correspondence of header information (label) of a received frame and the presence of a sequence number. In the illustrated example, label (1) indicates the presence of a sequence number, label (2) also indicates the presence of a sequence number, label (3) indicates the absence of a sequence number, etc.

Next, the operation of the ingress interface card shown in FIG. 4A and FIG. 4B will be explained. The packets input to the packet interface unit 403 are frames comprising a receiving port (Rec. Port (Pi)), pseudo wire header (PW Hdr (Li)), control word header (CW Hdr), and data. The pseudo wire frames are input from channels. This case assumes that the interface card has a plurality of physical ports, where all of the ports are not necessarily limited to ports that receive pseudo wire frames. Therefore, it is necessary to judge whether a frame is a pseudo wire frame based on the receiving port information. The receiving port attribute table 405 of FIG. 4A carries out this judgment (claim 4). When the look-up results of the receiving port attribute table 405 indicate a pseudo wire frame, what must be judged next is whether the pseudo wire frame has a control word. If it has a control word, the frame will have a sequence number. That is, the frame is for music data, voice data, etc. in which sequence is important. Whether it has a control word can be judged by looking up the sequence number presence table 406 by using, as a key, the input pseudo wire frame label value (header information).

FIGS. 6A-6C are views illustrating pseudo wire frame formats. As shown in FIG. 6A, a pseudo wire frame with no control word has no sequence number. As shown in FIG. 6B or 6C, a pseudo wire frame with a control word contains a sequence number.

Examples of the configuration of the pseudo wire frame formats are shown in the table below.

TABLE 1

| No. | Field name | Bit | Value | Meaning |
|---|---|---|---|---|
| 1 | PW label | 20 | — | — |
| 2 | Exp (experimental use) | 3 | — | COS |
| 3 | S (stack) | 1 | 1 | Bottom of stack (fixed value) |
| 4 | TTL | 8 | 0-255 | Time to Live |
| 5 | Reserved | 12 | 0x000 | All-0 |
| 6 | Sequence number | 16 | 0 | Non-sequence packet |
|   |   |   | 1-65535 | Correct sequence packet numbers |

When judgment processing from the receiving port attribute table 405 and sequence number table 506 results in judgment that the input packet is a pseudo wire frame and has a sequence number, it is necessary to check if the sequence number is in sequence. This is because, for music data and the like, out-of-sequence or redundant sequence numbers will lead to deterioration of sound quality. The reasons why packets assigned with a sequence number originally in sequence become packets with an out-of-sequence number, at the moment it is input to an ingress interface card, is as follows. For example, packets are lost or the packet order is switched due to packet congestion on a transmission line, deterioration of communication conditions, etc. To check if sequence numbers are input in the correct sequence, first, it is necessary to acquire the input pseudo wire frame's current sequence number information. This number information can be acquired by using, as a key, the label value (header information) of the input pseudo wire frame to look up the sequence number check control table 407 (claim 6). Note that, the first value of the sequence numbers is preset as the initial value of the sequence numbers to be stored in the sequence number check control table 407.

When accessing the sequence number check control table 407, in response to an access request to the sequence number check control table 407 from the first memory access point, the memory interface unit 408 runs a series of three processing operations comprising (1) reading, (2) addition, and (3) write back. In the read processing operation, the sequence number is read from the sequence number check control memory 407 by using, as a key, the label value (header information) of the input pseudo wire frame. In the addition processing operation, the value 1 is added to the read sequence number. In the write back processing operation, the added result is written into the read address space.

The contents of these three processing operations must be an integrated series. That is, note that access requests from other memory access points cannot be interposed between these three processing operations (claim 3). This is because, if responding to, for example, write requests (for example, to detect out-of-sequence and write new sequence number) from other memory access points between the (1) to (3)

processing operations, it will end up causing inconsistencies since the new value acquired from the addition processing operation (2) is not reflected in the memory.

Next, regarding the addition processing on the sequence number read by the processing operation (1), as explained before, in the 16-bit sequence number in a control word for a pseudo wire, according to processing according to the RFC standard, the sequence number=0xFFFF is followed not by 0x0000, but 0x0001 (referred to as round up processing), that is, 0x0000 must be skipped. This is because the sequence number=0x0000 is defined in the pseudo wire RFC standard as meaning "sequence number not used".

Normally, in (1) reading, (2) addition, and (3) write back processing operations, a comparison processing operation with 0x0000 as well as round processing operation up to 0x0001 can be incorporated between (2) and (3) as one integrated series, but if making such processing operations into one integrated series, it will occupy the memory interface for a long period of time and reduce packet throughput. Usually, the packet processing performance of the memory interface is calculated from [operation frequency]/[number of cycles until response]. For example, 100 MHz/4 cycles=25 Mpps (packet/second). In the case of consecutively arriving back-to-back packets, if processing at the memory interface unit 408 is not completed within these four cycles, the number of cycles will be five or more, whereby maximum performance for physical memory response cannot be utilized and throughput drops.

The embodiment takes into account that running the [comparison with 0x0000] and [round up (correct) to 0x0001] processing operations at the memory interface unit 408 increases the number of cycles of processing at the memory interface unit 408 and therefore runs these processing operations at the forwarding processing unit 410 and, if correction is necessary according to the results of comparison, runs correction processing operation at the next memory access point (n+1) (claim 2).

Normally, such an integrated processing series must be concluded with one access request to the memory interface unit 408, but as will be explained later, running correction judgment processing in the forwarding processing unit 410 and running correction write back processing at the next memory access point (n+1) will allow the load to be dispersed to other memory access points.

Figure 3:
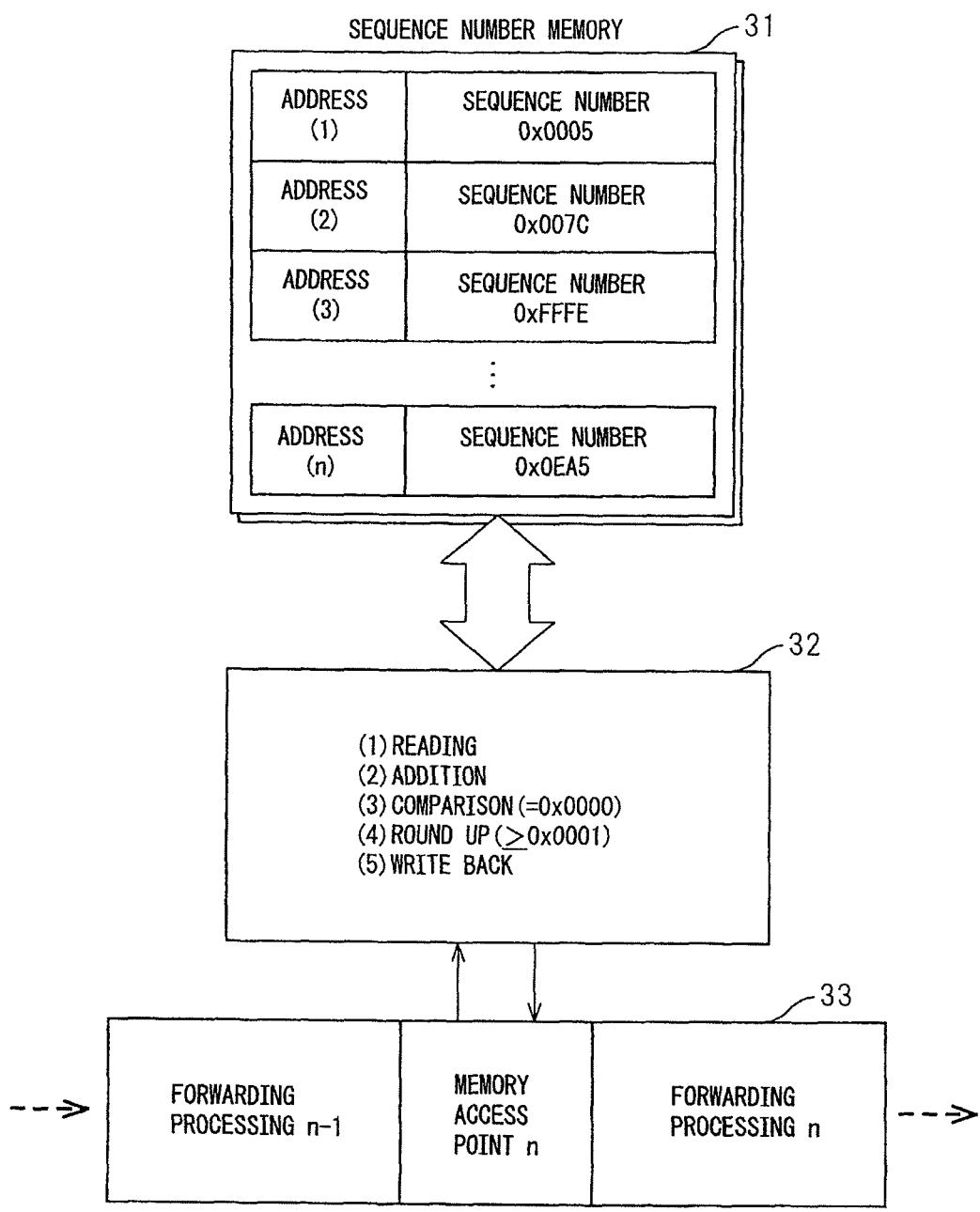
FIG. 3 is a block diagram illustrating a configuration of a conventional packet forwarding unit for explaining the problem to be solved by the embodiments.

FIG. 7 is a view explaining the sequence number recognition method at a forwarding processing unit in a first embodiment of the invention. First, FIG. 7 assumes that the sequence numbers read from the sequence number check control memory 407 are larger than 16 bits (here, a 32-bit read value). Using the topmost case as an example, when the value read from the sequence number check control memory 407 is 0x0000 0000, the memory interface unit 408 runs "+1" addition processing to the value read from the sequence number check control memory 407. It then writes back the addition result, i.e. 0x0000 0001 value, to the same memory space as the memory space that was read at the sequence number check control memory 407. At the same time, the addition result, i.e. 0x0000 0001 value, is responded to the forwarding processing unit 410. Because the response value is smaller than 0x0001 0000, the forwarding processing unit recognizes that correction addition and a correction write back processing operations are unnecessary (refer to the forwarding processing unit 32 of FIG. 3) and recognizes that the lower order 16 bits of the response value are the sequence number. In this case, it becomes 0x0001. This 0x0001 of the value read from the memory and the sequence number value of the input packet are compared and, if they match, the input packet is judged to be "in sequence" and the packet is passed through, while if they do not match, the input packet is judged "out-of-sequence" and the packet is discarded.

Using another case as an example, when the value read from the sequence number check control memory 407 is 0x0000 FFFF, the memory interface unit 408 runs "+1" addition processing to the read value, then writes back the addition result, i.e. 0x0001 0000 value, to the same memory space as the memory space that was read at the sequence number check control memory 407. At the same time, the addition result, i.e. 0x0001 0000 value, is responded to the forwarding processing unit 410. Because the response value becomes 0x0001 0000, the forwarding processing unit 410 recognizes that correction addition and correction write processing operations are necessary (refer to the forwarding processing unit 32 of FIG. 3) and recognizes that a value acquired from addition of "+1" to the response value's lower order 16 bits is the sequence number. In this case, it becomes 0x0001. Correction write processing is then carried out at the next memory access point (n+1).

As explained above, according to the embodiment of the present invention, comparison and judgment of the necessity of correction addition and correction write are carried out by the forwarding processing unit 410.

Next, a case when correction write processing is necessary will be explained. FIG. 8 is a view explaining correction write processing in a first embodiment of the invention.

At FIG. 8, an access request for correction write processing is sent at the next memory access point (n+1) which comes after the first memory access point (n). What must be considered here is, there may be a case where, after a packet which is judged to require correct correction write processing, following packet looks up the same sequence number in the sequence number check control memory 407 and where until the next correction write processing is carried out, some sequence numbers will be incremented in the sequence number check control memory 47.

That is, in correction write processing, 0x0001 0000 is not necessarily read. This is because until correction write processing is run at the next memory access point (n+1) on a packet which reads 0x0000 FFFF, "there is the possibility that the count will continue by the amount of the packets that are able to pass through one forwarding processing block". Therefore, the sequence number value of a packet judged to require correction write processing cannot be used for the value of correction write processing, so a newly read value is used (claim 7). In FIG. 8, when the value read in correction write processing is 0x0001 0000, a value where the higher order 16 bits are written over to 0x0000 and "+1" is added to the lower order 16 bits, i.e. 0x0000 0001, is written back to the sequence number check control memory 407. This is so, from FIG. 7, the 0x0001 0000 read from the 32-bit counter and 0x0000 0001 values are recognized as the same sequence numbers.

Further, while optional control, when out-of-sequence is detected, there are cases where the subsequently arriving packets will retain sequentiality from a one skipped number. In such a case, there is a control method storing the sequence number of the input packet, when out-of-sequence is detected, in the sequence number check control memory 407 (claim 9).

FIG. 9 is a view explaining a new number write processing in an embodiment of the present invention. As shown in FIG. 9, a 16-bit sequence number of an input packet is expanded to a 32-bit number and written back to the memory with no other change. Further, normally, in the forwarding processing unit 410, pairs of memory access points and forwarding processing units are arranged sequentially and the locations of the access points are considered so as to enable timely correction write processing. However, there may be cases where the correction write processing cannot be run at the next memory access point due to a heavy processing content load.

As shown in FIG. 4A and FIG. 4B, in such a case, there is the method of the forwarding processing unit 410 informing a monitoring control unit (CPU control unit 401) which label value's sequence number requires correction write processing and running correction write processing with software (claim 10). In this case, correction write processing is run from the CPU control unit 401 on the label number value.

Further, there may be a case where it is preferable for the monitoring control unit (CPU control unit 401) to read the current sequence number corresponding to each label value from the sequence number check control memory 407. In this case, the access for the sequence number check control memory 407 consists of only (1) reading. However, what must be taken into account is, as shown in FIG. 7, there may be a case where values over the 16-bit counter is to be read. To deal with this, recognition of the sequence number value read from the sequence number check control memory 407 that the forwarding processing unit 410 carries out, as in FIG. 7, must be run with software (claim 11). Note that, once processing for the sequence number check control memory 407, memory interface units 408 and 409, and forwarding processing unit 410 concludes, packets comprised of only header Hdr and data are output to the packet switching card from the forwarding processing unit 410. The output packets do not contain sequence numbers so it is necessary for the egress interface card, described below to create sequence numbers to assign to each packet.

Next, an embodiment controlling creation of pseudo wire 16-bit sequence numbers is shown. FIG. 5A and FIG. 5B are block diagrams illustrating two different portions of the configuration of an egress interface card of the packet forwarding unit according to a first embodiment of the invention. Basically, this can be dealt with by application of the embodiment for controlling checks of pseudo wire 16-bit sequence numbers as explained before, so a detailed explanation is omitted. In particular, the difference between check control and creation control of sequence numbers is that, while processing when out-of-sequence is detected had been required under check control (claim 9), it is not required in creation control.

Further, in the embodiment, the check control system and creation control system for pseudo wire 16-bit sequence numbers can be applied irrespective of the forwarding methods to be realized.

Realization is possible by any one of the following platforms to improve memory look-up performance according to the embodiment: LSI, FPGA and other hardware-based forwarding systems, NPU (network processor unit) and other programmable chip-based forwarding systems, and software-based forwarding systems.

Further, the embodiments can be applied as a management system for sequence numbers in pseudo wire frames with control words in the pseudo wire transmission method which has been of particular note in recent years.

INDUSTRIAL APPLICABILITY

According to the embodiments, a forwarding processing unit in a packet switching system can complete necessary processing in an allowable number of clock cycles in one table access. That is, according to the present invention, in a forwarding processing unit in a packet switching system, the number of cycles consumed in one table access can be reduced and a high throughput can be maintained even if packets using the same sequence numbers are input consecutively.

EXPLANATION OF REFERENCES

401 CPU control unit
402 CPU interface
403 first packet interface
404 virtual sequence
405 receiving port table
406 sequence number table
407 sequence number check control table
408 first memory interface unit
409 second memory interface unit
410 second packet interface unit
401 CPU control unit
502 CPU interface
503 first packet interface
505 virtual sequence
505 receiving port table
506 sequence number table
507 sequence number check control table
508 first memory interface unit
509 second memory interface unit
510 second packet interface unit

What is claimed is:

1. A packet switching system comprising:
a forwarding processing unit determining a destination of an input packet by analyzing the input packet and outputting it as an output packet, the forwarding processing unit comprises
an ingress interface card checking if the input packet has a sequential cyclic number and including an ingress side check control memory checking and controlling the sequential cyclic number, and
an egress interface card creating a sequential cyclic number and including an egress side check control memory of the sequential cyclic number to assign the sequential cyclic number to the output packet, wherein
the ingress interface card is coupled to the ingress side check control memory of the sequential cyclic numbers and comprises a first memory interface unit and a second memory interface unit, the ingress interface card dividing one access processing to the check control memory into a first process and a second process following right after the first process by performing the access processing at consecutive first and second memory access points, and
the forwarding processing unit judges, after processing at the first memory access point by the first memory interface unit, if correction of the sequential cyclic number is necessary on results of the processing by the first memory interface unit, and the second memory interface unit corrects the sequential cyclic number read from an address space of the ingress side check control memory at the second memory access point and writes the corrected sequential cyclic number to the address space of the ingress side check control memory when it is judged by the forwarding processing unit that the correction of the sequential cyclic number is necessary.

2. The packet switching system as set forth in claim 1, wherein the first memory interface unit comprises a processing unit running consecutively processing, at the first access point using the input packet header information as an address, to access the address space corresponding to the address of the check control memory and read corresponding sequence number stored in the check control memory, processing for adding 1 to the sequence number read by the reading processing, and processing writing back the results of addition by the addition processing to the address space of the check control memory.

3. The packet switching system as set forth in claim 1, wherein the forwarding processing unit further comprises a receiving port attribute table for judging if the receiving port of the input packet is for pseudo wires, looks up the receiving port attribute table using the input physical port information, as an address, assigned to each input packet, and executes access to the check control memory only when the receiving port is for pseudo wires.

4. The packet switching system as set forth in claim 3, wherein the forwarding processing unit further comprises a sequence number presence table for running a check, using the header of the input packet as an address, on whether the input packet has a control word of a virtual frame and executes access to the check control memory only when the input packet is judged to have the control word.

5. The packet switching system as set forth in claim 4, wherein the sequence number presence table further comprises a function of running a check on whether the control word contains the sequence number and executes access to the check control memory only when the control word is judged to contain the sequence number.

6. The packet switching system as set forth in claim 1, wherein when the forwarding processing unit judges correction to be necessary, the second memory interface unit corrects, at the second access point, the sequence number newly read from the address space of the check control memory and writes it to the address space of the check control memory.

7. The packet switching system as set forth in claim 1, further comprising a pipeline configuration wherein the first memory access point, the forwarding processing unit, and the second memory access point are sequentially arranged.

8. The packet switching system as set forth in claim 1, wherein when the forwarding processing unit detects that the sequence number of the input packet is out-of-sequence following the results of processing by the first memory interface unit, the second memory interface unit writes the sequence number of the out-of-sequence input packet to the check control memory.

9. The packet switching system as set forth in claim 1, wherein the forwarding processing unit comprises at least one hardware from among LSI and FPGA.

10. A packet switching system as set forth in claim 1, wherein the forwarding processing unit comprises a programmable chip.

11. A packet switching system as set forth in claim 1, the system is applied to check or creation control for 16-bit sequence numbers contained in a pseudo wire control word.

12. A packet switching system comprising:
a forwarding processing unit determining a destination of an input packet by analyzing the input packet and outputting it as an output packet, the forwarding processing unit comprises
an ingress interface card checking if the input packet has a sequential cyclic number and including an ingress side check control memory checking and controlling the sequential cyclic number, and
an egress interface card creating a sequential cyclic number and including an egress side check control memory of the sequential cyclic number to assign the sequential cyclic number to the output packet, wherein the egress interface card is coupled to the egress side check control memory of the sequential cyclic numbers and comprises a first memory interface unit and a second memory interface unit, the egress interface card dividing one access processing to the check control memory into a first process and a second process following right after the first process by performing the access processing at consecutive first and second memory access points, and
the forwarding processing unit judges, after processing at the first memory access point by the first memory interface unit, if correction of the sequential cyclic number is necessary on results of the processing by the first memory interface unit, and the second memory interface unit corrects the sequential cyclic number read from an address space of the egress side check control memory at the second memory access point and writes the corrected sequential cyclic number to the address space of the egress side check control memory when it is judged by the forwarding processing unit that the correction of the sequential cyclic number is necessary.

13. The packet switching system as set forth in claim 12, wherein the first memory interface unit comprises a processing unit running consecutively processing, at the first access point using the input packet header information as an address, to access the address space corresponding to the address of the check control memory and read corresponding sequence number stored in the check control memory, processing for adding 1 to the sequence number read by the reading processing, and processing writing back the results of addition by the addition processing to the address space of the check control memory.

14. The packet switching system as set forth in claim 12, wherein the forwarding processing unit further comprises a sending port attribute table for judging if the sending port of the output packet is for pseudo wires, looks up the sending port attribute table using the output physical port information, as an address, assigned to each output packet, and executes access to the check control memory only when the sending port is for pseudo wires.

15. The packet switching system as set forth in claim 14, wherein the forwarding processing unit further comprises a sequence number presence table for running a check, using the header of the output packet as an address, on whether the output packet has a control word of a virtual frame and executes access to the check control memory only when the output packet is judged to have the control word.

16. The packet switching system as set forth in claim 15, wherein the sequence number presence table further comprises a function of running a check on whether the control word contains the sequence number and executes access to the check control memory only when the control word is judged to contain the sequence number.

17. The packet switching system as set forth in claim 12, wherein when the forwarding processing unit judges correction to be necessary, the second memory interface unit corrects, at the second access point, the sequence number newly read from the address space of the check control memory and writes it to the address space of the check control memory.

18. The packet switching system as set forth in claim 12, further comprising a pipeline configuration wherein the first memory access point, the forwarding processing unit, and the second memory access point are sequentially arranged.

* * * * *